United States Patent
Xu et al.

(10) Patent No.: US 12,543,184 B2
(45) Date of Patent: Feb. 3, 2026

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Jing Xu, Guangdong (CN); Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 399 days.

(21) Appl. No.: 17/715,940

(22) Filed: Apr. 7, 2022

(65) Prior Publication Data

US 2022/0232541 A1 Jul. 21, 2022

Related U.S. Application Data

(63) Continuation of application No. PCT/CN2019/110212, filed on Oct. 9, 2019.

(51) Int. Cl.
| | | |
|---|---|---|
| *H04L 1/00* | (2006.01) | |
| *H04L 1/1812* | (2023.01) | |
| *H04W 72/23* | (2023.01) | |

(52) U.S. Cl.
CPC ........... *H04W 72/23* (2023.01); *H04L 1/0061* (2013.01); *H04L 1/1812* (2013.01)

(58) Field of Classification Search
CPC .... H04W 72/23; H04L 1/0061; H04L 1/1812; H04L 1/1614; H04L 1/1854;
(Continued)

(56) References Cited

U.S. PATENT DOCUMENTS

2017/0026940 A1 1/2017 Moulsley
2018/0262302 A1* 9/2018 Bergström ............ H04L 1/1896
(Continued)

FOREIGN PATENT DOCUMENTS

| CN | 109391422 | 2/2019 |
| CN | 110086583 | 8/2019 |

(Continued)

OTHER PUBLICATIONS

CNIPA, Second Office Action for CN Application No. 202210367534.2, Jul. 18, 2023.

(Continued)

*Primary Examiner* — Lakeram Jangbahadur
(74) *Attorney, Agent, or Firm* — Hodgson Russ LLP

(57) ABSTRACT

A wireless communication method, a terminal device, and a network device are provided. The method includes the following. A terminal device receives first downlink control information (DCI). The terminal device determines at least one physical layer parameter according to the first DCI, where the at least one physical layer parameter includes at least one of a feedback information priority, a feedback codebook type, a feedback type, a downlink assignment indicator (DAI) packet, a data priority, a content of DAI field, or a data processing capability. The terminal device transmits data or control information according to at least one of the feedback information priority, the feedback codebook type, the feedback type, the DAI group, the data priority, the content of DAI field, or the data processing capability.

10 Claims, 5 Drawing Sheets

(58) Field of Classification Search
CPC ... H04L 1/1887; H04L 1/1896; H04L 5/0055; H04L 1/1607
See application file for complete search history.

(56) References Cited

U.S. PATENT DOCUMENTS

| | | | | |
|---|---|---|---|---|
| 2020/0374045 | A1* | 11/2020 | Yin | ......... H04B 7/0456 |
| 2022/0123875 | A1* | 4/2022 | Liang | ......... H04L 5/0092 |

FOREIGN PATENT DOCUMENTS

| | | | | | |
|---|---|---|---|---|---|
| CN | 110086583 | A | * | 8/2019 | ......... H04L 5/0055 |
| CN | 110166183 | | | 8/2019 | |
| CN | 110166183 | A | * | 8/2019 | ......... H04L 5/0055 |
| WO | 2017160350 | | | 9/2017 | |
| WO | WO-2017160350 | A1 | * | 9/2017 | ......... H04L 1/1896 |
| WO | 2019028916 | A1 | | 2/2019 | |
| WO | 2019139908 | | | 7/2019 | |
| WO | WO-2019139908 | A1 | * | 7/2019 | ......... H04L 1/1896 |

OTHER PUBLICATIONS

CNIPA, Office Action for CN Application No. 2022103675342, Apr. 21, 2023.
Nokia et al., "On remaining aspects of NR CA/DC," 3GPP TSG-RAN WG1 Meeting NR#91, R1-1720512, Nov. 2017.
Fujitsu, "Alignment of DAI field of DCI format 1_0 between TS 38.212 and TS 38.213 draft,", 3GPP TSG RAN WG1 Meeting AH 1801, R1-1800127, Jan. 2018.
WIPO, International Search Report and Written Opinion for PCT/CN2019/110212, Jul. 7, 2020.
EPO, Extended European Search Report for EP Application No. 19948834.7, Aug. 16, 2022.
EPO, Communication for EP Application No. 19948834.7, Nov. 25, 2025.

* cited by examiner

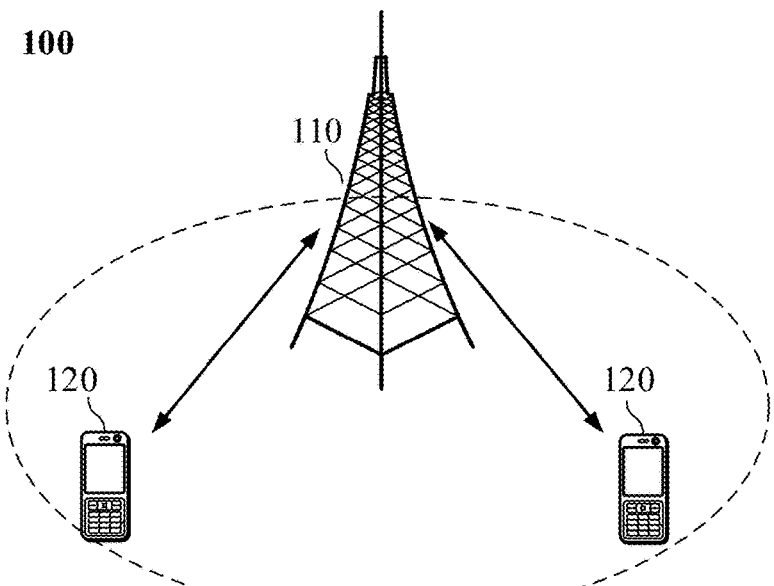
FIG. 1
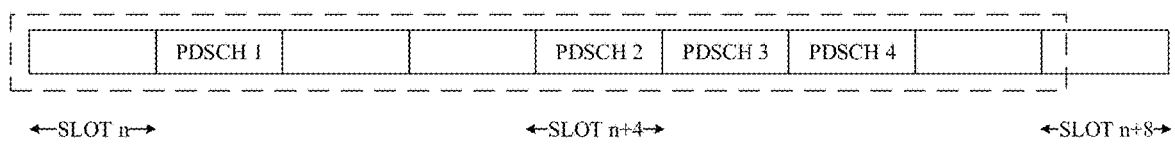
FIG. 2
| SLOT-BASED HARQ-ACK (DAI=1) | SUBSLOT-BASED HARQ-ACK (DAI=2) | SLOT-BASED HARQ-ACK (DAI=3) | SLOT-BASED HARQ-ACK (DAI=4) | SUBSLOT-BASED HARQ-ACK (DAI=5) |
|---|---|---|---|---|
FIG. 3

TERMINAL: SLOT-BASED HARQ-ACK {DAI=1, DAI=2, DAI=3}   SUBSLOT-BASED HARQ-ACK {DAI=1, DAI=2}

NETWORK  SLOT-BASED HARQ-ACK {DAI=1, DAI=2, DAI=3}   SUBSLOT-BASED HARQ-ACK {DAI=1, DAI=2}

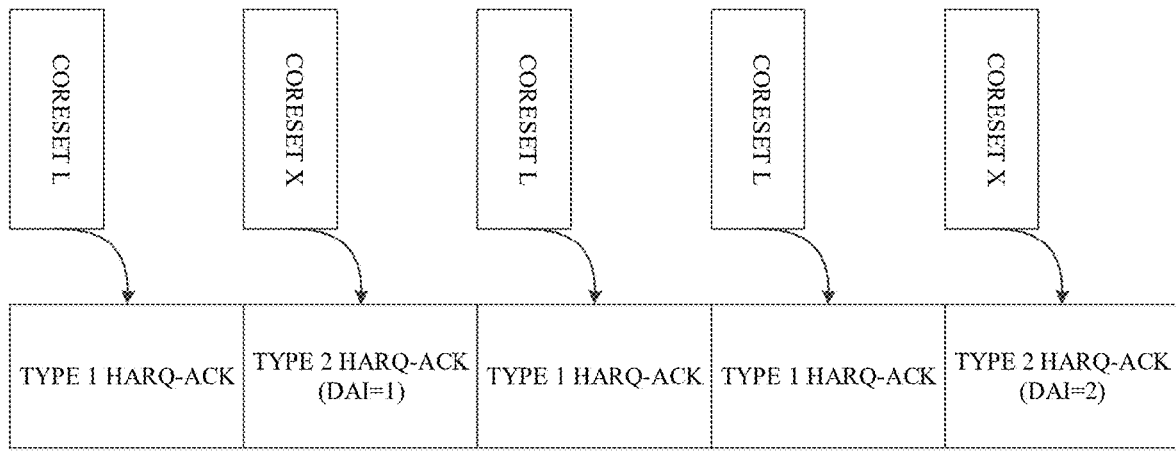

TERMINAL: TYPE 1 HARQ-ACK CODEBOOK {ACK, b1, ACK, NACK, b1}　　TYPE 2 HARQ-ACK CODEBOOK {DAI=1, DAI=2} b1: PLACEHOLDER

TRANSMIT, BY A NETWORK DEVICE, FIRST DCI TO A TERMINAL DEVICE. THE FIRST DCI INDICATES AT LEAST ONE PHYSICAL LAYER PARAMETER, WHERE THE AT LEAST ONE PHYSICAL LAYER PARAMETER INCLUDES AT LEAST ONE OF A FEEDBACK INFORMATION PRIORITY, A FEEDBACK CODEBOOK TYPE, A FEEDBACK TYPE, A DAI GROUP, A DATA PRIORITY, A CONTENT OF DAI FIELD, OR A DATA PROCESSING CAPABILITY — S310

FIG. 7

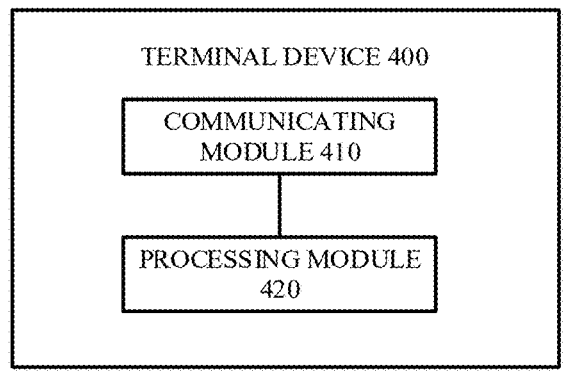

FIG. 8

WIRELESS COMMUNICATION METHOD, TERMINAL DEVICE, AND NETWORK DEVICE

CROSS-REFERENCE TO RELATED APPLICATION(S)

This application is a continuation of PCT/CN2019/110212, filed Oct. 9, 2019, the entire disclosure of which is hereby incorporated by reference.

TECHNICAL FIELD

Implementations of this disclosure relate to the field of communication, and particularly to a wireless communication method, a terminal device, and a network device.

BACKGROUND

In a new radio (NR) system, two hybrid automatic repeat request acknowledgement (HARQ-ACK) codebook types are defined: type 1 (that is, semi-static HARQ-ACK codebook) and type 2 (that is, dynamic HARQ-ACK codebook). For a single terminal device, only one HARQ-ACK codebook type is allowed to be configured.

In an NR system, multiple types of feedback can be supported, for example, slot-based HARQ-ACK feedback and subslot-based HARQ-ACK feedback. Slot-based HARQ-ACK feedback specifically means that physical uplink control channel (PUCCH) resources of HARQ-ACK feedback are allocated to a same slot. Subslot-based HARQ-ACK feedback specifically means that PUCCH resources of HARQ-ACK feedback are allocated to a same subslot. A mapping rule for multiple HARQ-ACKs in one PUCCH is defined according to a HARQ-ACK codebook.

For different types of services, such as ultra-reliable and low latency communication (URLLC) services, enhance mobile broadband (eMBB) services, etc., consider configuring different HARQ-ACK codebook types for different services. In this case, how to perform uplink feedback is a problem to be solved.

SUMMARY

In a first aspect, a wireless communication method is provided. The method includes the following. A terminal device receives first DCI. The terminal device determines at least one physical layer parameter according to the first DCI, where the at least one physical layer parameter includes at least one of a feedback information priority, a feedback codebook type, a feedback type, a DAI group, a data priority, a content of DAI field, or a data processing capability. The terminal device transmits data or control information according to at least one of the feedback information priority, the feedback codebook type, the feedback type, the DAI group, the data priority, the content of DAI field, or the data processing capability.

In a second aspect, a wireless communication method is provided. The method includes the following. A network device transmits first DCI to a terminal device. The first DCI indicates at least one physical layer parameter, where the at least one physical layer parameter includes at least one of a feedback information priority, a feedback codebook type, a feedback type, a DAI group, a data priority, a content of DAI field, or a data processing capability.

In a third aspect, a terminal device is provided. The terminal device is configured to perform the method described in the first aspect or in any possible implementation of the first aspect. Specifically, the terminal device includes a transceiver, a processor, and a memory storing computer programs which, when executed by the processor, can make the terminal device performing the method described in the first aspect or in any possible implementation of the first aspect.

In a fourth aspect, a network device is provided. The network device is configured to perform the method described in the second aspect or in any possible implementation of the second aspect. Specifically, the network device includes a transceiver, a processor, and a memory storing computer programs which, when executed by the processor, can make the network device the method described in the second aspect or in any possible implementation of the second aspect.

BRIEF DESCRIPTION OF THE DRAWINGS

FIG. 1 is a schematic diagram of an application scenario provided in implementations of the disclosure.

FIG. 2 is a schematic diagram illustrating reception of physical downlink shared channel (PDSCH).

FIG. 3 is a schematic diagram illustrating reception of physical downlink control channel (PDCCH).

FIG. 6 is another specific exemplary diagram of a wireless communication method according to implementations of the disclosure.

FIG. 7 is a schematic diagram of another wireless communication method provided in implementations of the disclosure.

FIG. 8 is a schematic block diagram of a terminal device provided in implementations of the disclosure.

DETAILED DESCRIPTION

Figure 4:
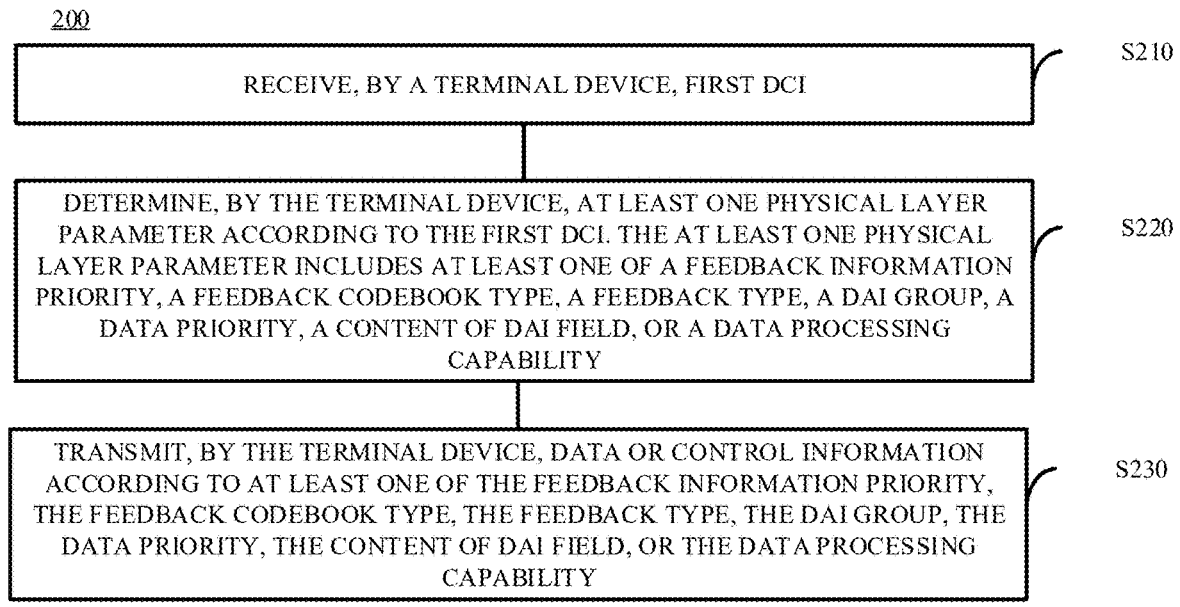
FIG. 4 is a schematic diagram of a wireless communication method provided in implementations of the disclosure.

The following will describe technical solutions of implementations of the disclosure with reference to the accompanying drawings in implementations of the disclosure. Apparently, implementations described herein are merely some implementations, rather than all implementations, of the disclosure. Based on the implementations of the disclosure, all other implementations obtained by those of ordinary skill in the art without creative effort shall fall within the protection scope of the disclosure.

The technical solutions of implementations of the disclosure are applicable to various communication systems, for example, a global system of mobile communication (GSM), a code division multiple access (CDMA) system, a wideband code division multiple access (WCDMA) system, a general packet radio service (GPRS), a long term evolution (LTE) system, an LTE frequency division duplex (LTE-FDD) system, an LTE time division duplex (LTE-TDD) system, a universal mobile telecommunication system (UMTS), a worldwide interoperability for microwave access (WiMAX) communication system, or a 5th generation (5G) system, etc.

Exemplarily, a communication system 100 applied to implementations of the disclosure is illustrated in FIG. 1. The communication system 100 may include a network device 110. The network device 110 may be a device that communicates with a terminal device 120 (also referred to as a communication terminal or a terminal). The network device 110 can provide a communication coverage for a specific geographical area and communicate with terminal devices in the coverage area. Optionally, the network device 110 may be a base transceiver station (BTS) in the GSM or in the CDMA system, or may be a NodeB (NB) in the WCDMA system, or may be an evolutional Node B (eNB or eNodeB) in the LTE system, or a radio controller in a cloud radio access network (CRAN). Alternatively, the network device may be a mobile switching center, a relay station, an access point, an in-vehicle device, a wearable device, a hub, a switch, a bridge, a router, a network-side device in a 5G network, or a network device in a future evolved public land mobile network (PLMN).

The communication system 100 further includes at least one terminal device 120 in a coverage area of the network device 110. The "terminal device" used herein includes but is not limited to a device configured to communicate via a wired line, another data connection/network, a wireless interface, a device which is part of another terminal device and configured to receive/transmit communication signals, and/or an Internet of things (IoT) device. Examples of the wired line may include, but are not limited to, a public switched telephone network (PSTN), a digital subscriber line (DSL), a digital cable, and a direct connection cable. Examples of the wireless interface may include, but are not limited to, a wireless interface for a cellular network, a wireless local area network (WLAN), a digital television network (such as a digital video broadcasting-handheld (DVB-H) network), a satellite network, and an amplitude modulation-frequency modulation (AM-FM) broadcast transmitter. A terminal device configured to communicate via a wireless interface may be called a "wireless communication terminal", a "wireless terminal", or a "mobile terminal". Examples of the mobile terminal include, but are not limited to, a satellite telephone or cellular telephone, a personal communication system (PCS) terminal integrated with functions of cellular radio telephone, data processing, fax, and/or data communication, a personal digital assistant (PDA) equipped with radio telephone, pager, Internet/Intranet access, web browsing, notebook, calendar, and/or global positioning system (GPS) receiver, a conventional laptop and/or a handheld receiver, or other electronic devices equipped with radio telephone transceiver. The terminal device may refer to an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, a handheld device with wireless communication functions, a computing device, other processing devices coupled with a wireless modem, an in-vehicle device, a wearable device, a terminal device in a 5G network, a terminal device in the future evolved PLMN, etc.

Optionally, terminal devices 120 can communicate with each other through device to device (D2D) communication.

Optionally, the 5G system or 5G network can also be referred to as a new radio (NR) system or NR network.

FIG. 1 exemplarily illustrates one network device and two terminal devices. Optionally, the communication system 100 may also include multiple network devices, and there can be other numbers of terminal devices in a coverage area of each of the network devices. Implementations of the disclosure are not limited in this regard.

Optionally, the communication system 100 may further include other network entities such as a network controller, a mobile management entity, or the like, and implementations of the disclosure are not limited in this regard.

It should be understood that, in implementations of the disclosure, a device with communication functions in a network/system can be referred to as a "communication device". Taking the communication system 100 illustrated in FIG. 1 as an example, the communication device may include the network device 110 and the terminal device(s) 120 that have communication functions. The network device 110 and the terminal device(s) 120 can be the devices described above and will not be repeated herein. The communication device may further include other devices such as a network controller, a mobile management entity, or other network entities in the communication system 100, and implementations of the disclosure are not limited in this regard.

It should be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein generally indicates that the associated objects are in an "or" relationship.

To facilitate understanding of implementations of the disclosure, a physical uplink control channel (PUCCH) multiplexing type used for hybrid automatic repeat request acknowledgement (HARQ-ACK) (or referred to as HARQ-ACK feedback type) and a HARQ-ACK codebook type will be first described.

1. Slot-based PUCCH multiplexing, also referred to as slot-based HARQ-ACK feedback. Specifically, PUCCH resources used for HARQ-ACK feedback can be allocated to a same slot, that is, multiple pieces of HARQ-ACK information can be multiplexed on one PUCCH resource for feedback. The PUCCH resource for multiplexing may be determined according to a recent PUCCH indication (one among the multiple pieces of HARQ-ACK information is feedback for dynamic downlink transmission, that is, downlink transmission scheduled by a physical downlink control channel (PDCCH)), or may be determined according to a semi-statically configured PUCCH resource (the multiple pieces of HARQ-ACK information are all intended for semi-statically scheduled downlink transmission).

2. In order to reduce delay of slot-level PUCCH multiplexing used for HARQ-ACK, subslot-based PUCCH multiplexing is introduced, which is also referred to as subslot-based HARQ-ACK feedback. For PUCCH multiplexing used for HARQ-ACK, a mapping rule for multiple pieces of HARQ-ACK information in one PUCCH can be defined through a HARQ-ACK codebook.

For type 1, i.e. semi-static HARQ-ACK codebook (also referred to as semi-static feedback codebook), the number of bits of feedback information contained in a semi-static HARQ-ACK codebook is determined according to a semi-statically configured parameter (for example, a HARQ timing set, a physical downlink shared channel (PDSCH) time domain resource allocation list, etc.). Specifically, the bits contained in the codebook correspond to each physical resource that can transmit PDSCH in a semi-statically configured feedback window. The number of PDSCHs actually scheduled is less than or equal to that of physical resources that can transmit PDSCH in the feedback window. For one physical resource that can transmit PDSCH, if downlink control information (DCI) format 1_0 or DCI format 1_1 for scheduling a PDSCH transmitted on the physical resource is not received by the terminal device, the terminal device sets negative acknowledged (NACK) at a bit corresponding to the physical resource; otherwise, an actual decoding result is set at the corresponding bit. As illustrated in FIG. 2, in a feedback window of slot n~slot n+7, if PDSCH 1, PDSCH 2, PDSCH 3, and PDSCH 4 are received by the terminal device respectively in slot n+1, slot n+4, slot n+5, and slot n+6, a feedback result (i.e. codebook) in the feedback window can be {NACK, b1, NACK, NACK, b2, b3, b4, NACK}, where b1, b2, b3, and b4 respectively represent a decoding result corresponding to each of PDSCH 1, PDSCH 2, PDSCH 3, and PDSCH 4.

For type 2, i.e. dynamic HARQ-ACK codebook (also referred to as dynamic feedback codebook), the terminal device determines the number of bits of feedback information according to a downlink assignment indicator (DAI) information field in DCI corresponding to a PDSCH actually received, where each bit is an actual decoding result of the received PDSCH. For the PDSCH reception illustrated in FIG. 2, the dynamic HARQ-ACK codebook is {b1, b2, b3, b4}.

As can be seen from the above, the semi-static HARQ-ACK codebook is low in feedback efficiency, and feedback is required regardless of whether there is PDSCH transmission. However, because the semi-static HARQ-ACK codebook does not rely on indication of a DAI information field in a PDCCH, PDCCH decoding errors or missed detections will not affect HARQ-ACK feedback. The dynamic HARQ-ACK codebook is high in feedback efficiency, but relies on indication of a DAI in a PDCCH, and PDCCH decoding errors or missed detections will affect HARQ-ACK feedback.

In an NR system, consider configuring at least two feedback codebook types for one terminal device to meet requirements of different services. In this case, if the terminal device misses a PDCCH, the terminal device is unable to determine a HARQ-ACK feedback type of a PDSCH scheduled by the missed PDCCH. As illustrated in FIG. 3, the terminal device can determine, according to a DAI in a received PDCCH, that a PDCCH with DAI=3 is missed, but the terminal device is unable to determine a HARQ-ACK feedback type corresponding to a PDSCH scheduled by the PDCCH. How to give feedback is a problem to be solved.

Implementations of the disclosure provide a wireless communication method, a terminal device, and a network device, which can determine at least one of a feedback information priority, a feedback codebook type, a feedback type, a downlink assignment indicator (DAI) packet, a data priority, a content of DAI field, or a data processing capability according to downlink control information (DCI) transmitted by a network device, thereby achieving transmission of uplink data or control information.

FIG. 4 is a schematic flowchart of a wireless communication method provided in implementations of the disclosure. The method 200 can be performed by the terminal device in the communication system illustrated in FIG. 1. As illustrated in FIG. 4, the method at least includes some of the following.

S210, a terminal device receives first DCI.

S220, the terminal device determines at least one physical layer parameter according to the first DCI. The at least one physical layer parameter includes at least one of a feedback information priority, a feedback codebook type, a feedback type, a DAI group, a data priority, a content of DAI field, or a data processing capability.

S230, the terminal device transmits data or control information according to at least one of the feedback information priority, the feedback codebook type, the feedback type, the DAI group, the data priority, the content of DAI field, or the data processing capability.

Based on the above technical solutions, the terminal device can determine at least one of the feedback information priority, the feedback codebook type, the feedback type, the DAI group, the data priority, the content of DAI field, or the data processing capability according to DCI transmitted by the network device. As such, the terminal device can transmit data or control information according to at least one of the feedback information priority, the feedback codebook type, the feedback type, the DAI group, the data priority, the content of DAI field, or the data processing capability.

In some implementations, the data may be data scheduled by the first DCI. The control information may include feedback information of a PDSCH scheduled by the first DCI, such as HARQ-ACK information carried by a PUCCH, or may include uplink control information (UCI) carried by the PUCCH.

Optionally, in some implementations, the feedback information priority may be HARQ-ACK priority. The HARQ-ACK priority can be used for determining feedback information to be first transmitted in case time-domain resources of two pieces of feedback information overlap.

For example, if a time-domain resource of first feedback information to-be-transmitted overlaps with that of second feedback information to-be-transmitted, the terminal device can determine feedback information to be first transmitted according to a HARQ-ACK priority of the first feedback information and a HARQ-ACK priority of the second feedback information. Exemplarily, if the HARQ-ACK priority of the first feedback information is higher than that of the second feedback information, the terminal device can first transmit the first feedback information. The first feedback information may be scheduled by the first DCI. The first feedback information may be feedback information of downlink data scheduled by the first DCI. The second feedback information may be feedback information of downlink data scheduled by second DCI.

It should be understood that, in implementations of the disclosure, the data processing capability is determined by a data processing time. If information to-be-transmitted is uplink data, the data processing time may include time spent in processing the uplink data before transmission of the uplink data, such as time spent in modulating the uplink data. Alternatively, if the information to-be-transmitted is feedback information, processing time of the feedback information may include time spent in processing downlink data corresponding to the feedback information after reception of the downlink data (such as time spent in detecting and demodulating the downlink data) and time spent in processing the feedback information (such as time spent in modulating the feedback information).

Optionally, in some implementations, the data priority can be used for determining data to be first transmitted in case time-domain resources of two pieces of data overlap.

For example, if a time-domain resource of first uplink data to-be-transmitted overlaps with that of second uplink data to-be-transmitted, the terminal device can determine uplink data to be first transmitted according to a data priority of the first uplink data and a data priority of the second uplink data. Exemplarily, if the data priority of the first uplink data is higher than that of the second uplink data, the terminal device can first transmit the first uplink data. The first uplink data may be first uplink data scheduled by the first DCI. The second uplink data may be second uplink data scheduled by second DCI.

Optionally, in some implementations, the feedback codebook type may include the two feedback codebook types described above (such as a semi-static HARQ-ACK codebook and a dynamic HARQ-ACK codebook), or may include more feedback codebook types, and implementations of the disclosure are not limited in this regard.

Optionally, in some implementations, the feedback type may include the two feedback types described above (such as slot-based HARQ-ACK feedback and subslot-based HARQ-ACK feedback), or may include more feedback types, and implementations of the disclosure are not limited in this regard.

In implementations of the disclosure, multiple DAI groups may be configured. A single DAI group is separately counted in sequence. Optionally, the multiple DAI groups may correspond to different feedback types and/or feedback codebook types. For example, different feedback types may be configured to correspond to different DAI groups, for instance, slot-based HARQ-ACK feedback corresponds to a first DAI group and subslot-based HARQ-ACK feedback corresponds to a second DAI group. Alternatively, different feedback codebook types may be configured to correspond to different DAI groups, for instance, a semi-static HARQ-ACK codebook corresponds to a first DAI group and a dynamic HARQ-ACK codebook corresponds to a second DAI group.

Optionally, in some implementations, the terminal device can determine the at least one physical layer parameter according to a DCI format, a transmission resource of DCI, a transmission mode (such as scrambling mode), etc. In other words, a network device can indicate the at least one physical layer parameter through the DCI format, the transmission resource of DCI, the transmission mode (such as scrambling mode), etc.

It should be understood that, in implementations of the disclosure, the transmission resource of DCI may include a time-domain resource used for transmitting DCI such as a search space of DCI, or may include a resource set used for transmitting DCI such as control resource set (CORESET), or may include other transmission resources such as code-domain resource, or the like, and implementations of the disclosure are not limited in this regard.

Optionally, in some implementations, S210 may specifically include the following. The terminal device determines the at least one physical layer parameter according to at least one of a format of the first DCI, a radio network temporary identity (RNTI) for scrambling a cyclical redundancy check (CRC) of the first DCI, an indicator field in the first DCI, a search space used for receiving the first DCI, or a resource set used for receiving the first DCI.

The following will take determining the DAI group or the feedback codebook type by the terminal device according to at least one of the format of the first DCI, the RNTI for scrambling a CRC of the first DCI, the indicator field in the first DCI, the search space used for receiving the first DCI, or the resource set used for receiving the first DCI as an example for illustration in connection with specific embodiments. Other embodiments are implemented in a similar manner is and thus will not be elaborated herein.

Embodiment 1-1: The Terminal Device Determines the DAI Group According to the Format of the First DCI.

In some scenarios, the network device may adopt different scheduling strategies for different services. Specifically, different DCI formats may be used, that is, DCI formats can be related to services. Therefore, by indicating different DAI groups through DCI formats, it is possible to achieve separate feedback for different services.

In some implementations, DCI formats and DAI groups may have a first correspondence. In this case, the terminal device can determine the DAI group according to the format of the first DCI received as well as the first correspondence.

Optionally, the first correspondence may be predefined, or may be configured by the network device, and implementations of the disclosure are not limited in this regard.

For example, in the first correspondence, DCI format 1_x (for example, x>1) corresponds to a first DAI group. DCI formats 1_0 and 1_1 correspond to a second DAI group. In this case, after receiving a PDCCH, the terminal device can determine a DCI format of the first DCI carried by the PDCCH, and then determine the DAI group according to the DCI format as well as the first correspondence. For instance, if the DCI format is DCI format 1_2, a DAI field in the DCI corresponds to the first DAI group. Alternatively, if the DCI format is DCI format 1_0 or 1_1, a DAI field in the DCI format corresponds to the second DAI group.

Therefore, in embodiment 1-1, the network device can indicate DAI groups through different DCI formats. As such, the terminal device can determine the DAI group according to a format of received DCI, and then transmit data or control information according to the DAI group, which is beneficial to meeting transmission requirements of various services.

It should be understood that, in embodiment 1-1, the first correspondence is merely an example. The first correspondence may also contain a new DCI format. For example, the new DCI format corresponds to the first DAI group, and an existing DCI format corresponds to the second DAI group. If DCI received by the terminal device is the new DCI format, the terminal device can determine that a DAI field in the DCI corresponds to the first DAI group. If the DCI is an existing DCI format such as DCI format 0_0 or DCI format 0_1, the terminal device can determine that the DAI field in the DCI corresponds to the second DAI group.

Embodiment 1-2: The terminal device can determine the DAI group according to the RNTI for scrambling a CRC of the first DCI.

In some implementations, RNTIs for scrambling a CRC of the first DCI and DAI groups may have a second correspondence. Therefore, the network device can indicate different DAI groups through different RNTIs. Then the terminal device can determine the DAI group according to the RNTI for scrambling a CRC of the first DCI as well as the second correspondence.

Optionally, the second correspondence may be predefined, or may be configured by the network device, and implementations of the disclosure are not limited in this regard.

For example, in the second correspondence, a first RNTI corresponds to a first DAI group, and a second RNTI corresponds to a second DAI group. In this case, after receiving a PDCCH, the terminal device can determine the RNTI for scrambling a CRC of the first DCI, and then determine the DAI group according to the RNTI as well as the second correspondence. For example, if the RNTI is the first RNTI, a DAI field in DCI corresponds to the first DAI group. Alternatively, if the RNTI is the second RNTI, the DAI field in the DCI corresponds to the second DAI group.

Therefore, in embodiment 1-2, the network device can indicate DAI groups through different RNTIs. As such, the terminal device can determine the DAI group according to a scrambling mode of received DCI, and then transmit data or control information according to the DAI group, which is beneficial to meeting transmission requirements of various services.

In practice, a modulation and coding scheme-cell-RNTI (MCS-C-RNTI) and a cell RNTI (C-RNTI) are introduced to achieve user specific scheduling, and the two may correspond to different MCS tables. For example, a table corresponding to an MCS-C-RNTI usually covers an MCS corresponding to low-spectral efficiency, and a table corresponding to a C-RNTI usually covers an MCS corresponding to medium-spectral efficiency. Therefore, the former is applicable to high-reliability transmission, and the latter is applicable to transmission with medium reliability requirements. In addition, reliability and delay have a certain correspondence, for example, high reliability usually corresponds to low delay, and medium reliability usually corresponds to medium delay. By adopting different RNTIs to indicate different DAI groups, it is possible to achieve separate feedback for various services.

As an example, the first RNTI may be an MCS-C-RNTI and correspond to the first DAI group, and the second RNTI may be a C-RNTI and correspond to the second DAI group. For a PDCCH scrambled by other RNTIs such as a system information (SI)-RNTI, a random access (RA)-RNTI, or a paging-RNTI (P-RNTI), these RNTIs may correspond to the same DAI group as the C-RNTI, or may correspond to a DAI group corresponding to a slot-based feedback type.

As such, when detecting a PDCCH, the terminal device can determine an RNTI for scrambling a CRC of the PDCCH and then determine the DAI group according to the RNTI and the second correspondence. For example, when the terminal device detects that the CRC of the PDCCH is scrambled by the MCS-C-RNTI, the terminal device can determine that a DAI field in the first DCI corresponds to the first DAI group. When the terminal device detects that the CRC of the PDCCH is scrambled by the C-RNTI, the terminal device can determine that the DAI field in the first DCI corresponds to the second DAI group.

It should be understood that, in embodiment 1-2, the second correspondence is merely an example. The second correspondence may also contain a new RNTI. For example, the new RNTI corresponds to the first DAI group, and an existing RNTI corresponds to the second DAI group. If a CRC of a received PDCCH is scrambled by the new RNTI, it can be determined that the DAI group is the first DAI group. If the CRC of the received PDCCH is scrambled by an existing RNTI such as C-RNTI or RA-RNTI, it can be determined that the DAI group is the second DAI group.

Embodiment 1-3: The terminal device can determine the DAI group according to the indicator field in the first DCI.

Optionally, in some implementations, the indicator field in the first DCI may be a new indicator field that indicates the DAI group. For example, the DAI group has two types, and the indicator field may have 1 bit that indicates the two types of DAI groups respectively. Alternatively, if the DAI group has more types, the indicator field may have more bits, which will not be elaborated herein.

Optionally, in other implementations, the indicator field in the first DCI may be an existing indicator field. By multiplexing the existing indicator field to indicate different DAI groups, it is conducive to reducing signaling overhead. For example, the existing indicator field may be a PUCCH resource indicator or a PDSCH-to-HARQ feedback timing indicator. Taking a PUCCH resource indicator as an example of the indicator field, if the PUCCH resource indicator indicates a subslot PUCCH resource, it can be determined that a DAI in the first DCI corresponds to a first DAI group; alternatively, if the PUCCH resource indicator indicates a slot PUCCH resource, it can be determined that a DAI in the first DCI corresponds to a second DAI group.

Therefore, in embodiment 1-3, the network device can flexibly indicate the DAI group through an indicator field in DCI without changing a DCI format or an RNTI. As such, the terminal device can determine the DAI group according to the indicator field in the received DCI, and then transmit data or control information according to the DAI group, which is beneficial to meeting transmission requirements of various services.

Embodiment 1-4: The terminal device can determine the DAI group according to the search space or the CORESET for receiving the first DCI.

In some implementations, search spaces or CORESETs used for transmitting DCI and DAI groups may have a correspondence. In this case, the network device can indicate the DAI group through a search space or a CORESET for transmitting DCI. Therefore, in embodiment 1-4, the terminal device can determine the DAI group before detecting a PDCCH or PDSCH. Optionally, the correspondence may be predefined, or may be configured by the network device, and implementations of the disclosure are not limited in this regard.

The following will take indicating the DAI group through the CORESET as an example for illustration, which is also applicable to indicating the DAI group through the search space, and the latter will not be described in detail herein for the sake of simplicity.

For example, in the correspondence, CORESETs X, Y, Z (for example, X, Y, Z>1) correspond to a first DAI group, and CORESETs L, M, N (for example, L, M, N>1) correspond to a second DAI group. The terminal device can determine the DAI group according to a CORESET for receiving a PDCCH as well as the correspondence. For instance, if the terminal device receives the PDCCH on CORESET X, the terminal device can determine that a DAI field in the first DCI corresponds to the first DAI group; alternatively, if the terminal device receives the PDCCH on CORESET L, the terminal device can determine that the DAI field in the first DCI corresponds to the second DAI group.

In some implementations, the first DAI group may correspond to subslot-based feedback, and the second DAI group may correspond to slot-based feedback. Alternatively, the first DAI group corresponds to a dynamic HARQ-ACK codebook, and the second DAI group corresponds to a semi-static HARQ-ACK codebook.

In some implementations, for CORESET 0 or a CORESET used before radio resource control (RRC) connection establishment, a DAI group corresponding thereto may be configured to be a DAI group corresponding to slot-based feedback.

After determining the DAI group, separate transmission of feedback information can be performed by the terminal device according to the DAI group. Specifically, an order of the feedback information in the packet can be determined according to a DAI in the first DCI. Taking embodiment 1-4 as an example for further illustration, the terminal device can determine the DAI group according to the CORESET for receiving DCI, and then can map the feedback information onto a feedback codebook corresponding to the DAI group. A location of each piece of feedback information in the feedback codebook can be determined according to the DAI.

Figure 5:
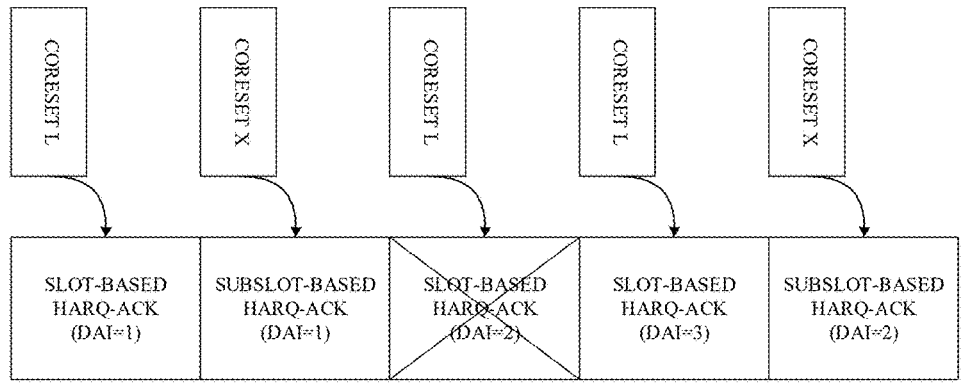
FIG. 5 is a specific exemplary diagram of a wireless communication method according to implementations of the disclosure.

As illustrated in FIG. 5, the terminal device receives PDCCHs sequentially on CORESET L, CORESET X, CORESET L, and CORESET X, a serial number of a DAI in each of the above four PDCCHs is sequentially 1, 1, 3, and 2. As can be seen from above, DAIs in a same DAI group are separately counted in sequence. It can be determined that a PDCCH with DAI=2 in a DAI group corresponding to slot-based feedback is missed. In addition, when transmitting feedback information, a second location in a codebook corresponding to the DAI group can be occupied, for example, the bit can be set to be NACK.

Embodiment 2

Based on the manners illustrated in embodiment 1-1 to embodiment 1-4, the terminal device can also determine the feedback codebook type according to at least one of the format of the first DCI, the RNTI used for scrambling a CRC of the first DCI, the indicator field in the first DCI, the search space used for receiving the first DCI, or the resource set used for receiving the first DCI, which will not be described in detail herein for the sake of simplicity.

Take determining the feedback codebook type according to a CORESET used for receiving the first DCI as an example. CORESETs of DCI and feedback codebook types may have a correspondence. The terminal device can determine the feedback codebook type according to a CORESET for receiving DCI as well as the correspondence.

For example, in the correspondence, CORESETs X, Y, Z (for example, X, Y, Z>1) correspond to a dynamic HARQ-ACK codebook, and CORESETs L, M, N (for example, L, M, N>1) correspond to a semi-static HARQ-ACK codebook. The terminal device can determine a feedback codebook type adopted by a PDSCH scheduled by the first DCI according to a CORESET for receiving a PDCCH as well as the correspondence. For instance, if the PDCCH is received on CORESET X, it can be determined that the PDSCH scheduled by the first DCI adopts the dynamic HARQ-ACK codebook. Then the terminal device can determine a location of feedback information of the PDSCH in the dynamic HARQ-ACK codebook according to a DAI field in the first DCI. For the specific implementation thereof, reference can be made to the example illustrated in FIG. 5. Alternatively, if the PDCCH is received on CORESET L, it can be determined that the PDSCH scheduled by the first DCI adopts the semi-static HARQ-ACK codebook. In this case, in some implementations, information in the DAI field in the first DCI may adopt a preset bit as a virtual CRC, to improve PDCCH detection accuracy. Alternatively, information in the DAI field in the first DCI indicates other meanings, such as PDSCH-to-HARQ-ACK timing or the like, which are used for extending the lengths of other indicator fields.

In addition, the terminal device can map HARQ-ACK information of the received PDSCH onto a corresponding HARQ-ACK codebook according to the feedback codebook type and transmit to the network device.

For example, as illustrated in FIG. 6, if the terminal device receives PDCCH 1, PDCCH 2, PDCCH 3, PDCCH 4, and PDCCH 5 sequentially on CORESET L, CORESET X, CORESET L, CORESET L, and CORESET X, the terminal device can determine that PDCCH 2 and PDCCH 5 adopt the dynamic HARQ-ACK codebook, and other PDSCHs adopt the semi-static HARQ-ACK codebook, where a serial number of a DAI in each of PDCCH 2 and PDCCH 5 is respectively 1 and 2. During HARQ-ACK feedback, the terminal device can map HARQ-ACK information of PDSCHs of different feedback codebook types onto different feedback codebooks. For the semi-static HARQ-ACK codebook, the terminal device can occupy a second location and a fifth location, while other locations are actual decoding results of received PDSCHs. For the dynamic HARQ-ACK codebook, the codebook may have only two bits which are respectively actual decoding results of PDSCHs scheduled by PDCCH 2 and PDCCH 5.

Embodiment 3

The terminal device determines at least two physical layer parameters according to at least one of the format of the first DCI, the RNTI for scrambling a CRC of the first DCI, the indicator field in the first DCI, the search space used for receiving the first DCI, or the resource set used for receiving the first DCI, where the at least two physical layer parameters include at least two of a feedback information priority, a feedback codebook type, a feedback type, a DAI group, a data priority, a content of DAI field, and a data processing capability. In embodiment 3, the network device can indicate, through one piece of information, pieces of information that are closely related, which is beneficial to reducing physical layer overhead.

As an example, the network device can indicate information related to HARQ-ACK through one piece of information. For example, the network device can indicate at least two of the feedback information priority, the feedback codebook type, the feedback type, and the DAI group through at least one of the format of the first DCI, the RNTI for scrambling a CRC of the first DCI, the indicator field in the first DCI, the search space used for receiving the first DCI, or the resource set used for receiving the first DCI.

Accordingly, the terminal device can determine at least two of the feedback information priority, the feedback codebook type, the feedback type, and the DAI group according to at least one of the format of the first DCI, the RNTI for scrambling a CRC of the first DCI, the indicator field in the first DCI, the search space used for receiving the first DCI, or the resource set used for receiving the first DCI.

As another example, the network device can indicate information related to priority through one piece of information. For example, the network device can indicate the feedback information priority and the data priority through at least one of the format of the first DCI, the RNTI for scrambling a CRC of the first DCI, the indicator field in the first DCI, the search space used for receiving the first DCI, or the resource set used for receiving the first DCI.

Accordingly, the terminal device can determine the feedback information priority and the data priority according to at least one of the format of the first DCI, the RNTI for scrambling a CRC of the first DCI, the indicator field in the first DCI, the search space used for receiving the first DCI, or the resource set used for receiving the first DCI.

As another example, the network device can indicate information related to processing capability through one piece of information. For example, the network device can indicate the feedback type and the data processing capability through at least one of the format of the first DCI, the RNTI for scrambling a CRC of the first DCI, the indicator field in the first DCI, the search space used for receiving the first DCI, or the resource set used for receiving the first DCI.

Accordingly, the terminal device can determine the feedback type and the data processing capability according to at least one of the format of the first DCI, the RNTI for scrambling a CRC of the first DCI, the indicator field in the first DCI, the search space used for receiving the first DCI, or the resource set used for receiving the first DCI.

For the manner of indication in the above examples, reference can be made to the implementations in embodiment 1 and embodiment 2 above, which will not be elaborated herein for the sake of simplicity.

The wireless communication method according to implementations of the disclosure has been described in detail above from the perspective of the terminal device in connection with FIG. 4 to FIG. 6. The following will describe in detail a wireless communication method according to other implementations of the disclosure from the perspective of a network device in connection with FIG. 7. It should be understood that, description at a network-device side and description at a terminal-device side correspond to each other. For similar descriptions, reference can be made to the foregoing descriptions, which will not be elaborated again herein to avoid repetition.

FIG. 7 is a schematic flowchart of a wireless communication method 300 according to other implementations of the disclosure. The method 300 may be performed by the network device in the communication system illustrated in FIG. 1. As illustrated in FIG. 7, the method 300 includes the following.

S310, a network device transmits first DCI to a terminal device. The first DCI indicates at least one physical layer parameter, where the at least one physical layer parameter includes at least one of a feedback information priority, a feedback codebook type, a feedback type, a DAI group, a data priority, a content of DAI field, or a data processing capability.

Optionally, in some implementations, at least one of a format of the first DCI, an RNTI for scrambling a CRC of the first DCI, an indicator field in the first DCI, a search space used for receiving the first DCI, or a resource set used for receiving the first DCI indicates the at least one physical layer parameter.

Optionally, in some implementations, at least one of a format of the first DCI, an RNTI for scrambling a CRC of the first DCI, an indicator field in the first DCI, a search space used for receiving the first DCI, or a resource set used for receiving the first DCI indicates at least two physical layer parameters, where the at least two physical layer parameters include at least two of the feedback information priority, the feedback codebook type, the feedback type, the DAI group, the data priority, the content of DAI field, and the data processing capability.

Optionally, in some implementations, at least one of the format of the first DCI, the RNTI for scrambling a CRC of the first DCI, the indicator field in the first DCI, the search space used for receiving the first DCI, or the resource set used for receiving the first DCI indicates at least two of the feedback information priority, the feedback codebook type, the feedback type, and the DAI group. Alternatively, at least one of the format of the first DCI, the RNTI for scrambling a CRC of the first DCI, the indicator field in the first DCI, the search space used for receiving the first DCI, or the resource set used for receiving the first DCI indicates the feedback information priority and the data priority. Alternatively, at least one of the format of the first DCI, the RNTI for scrambling a CRC of the first DCI, the indicator field in the first DCI, the search space used for receiving the first DCI, or the resource set used for receiving the first DCI indicates the feedback type and the data processing capability.

Optionally, in some implementations, the feedback codebook type includes a semi-static feedback codebook and a dynamic feedback codebook. The feedback type includes slot-based feedback and subslot-based feedback. The DAI group includes a first DAI group and a second DAI group, where the first DAI group and the second DAI group correspond to their respective feedback codebook types and/or feedback types.

Method implementations of the disclosure have been described in detail above in connection with FIG. 4 to FIG. 7. The following will describe in detail apparatus implementations of the disclosure in connection with FIG. 8 to FIG. 12. It should be understood that, apparatus implementations and method implementations correspond to each other. For similar descriptions, reference can be made to the method implementations.

FIG. 8 is a schematic block diagram of a terminal device 400 according to implementations of the disclosure. As illustrated in FIG. 8, the terminal device 400 includes a communicating module 410 and a processing module 420. The communicating module 410 is configured to receive first DCI. The processing module 420 is configured to determine at least one physical layer parameter according to the first DCI, where the at least one physical layer parameter includes at least one of a feedback information priority, a feedback codebook type, a feedback type, a DAI group, a data priority, a content of DAI field, or a data processing capability. The communicating module 410 is further configured to transmit data or control information according to at least one of the feedback information priority, the feedback codebook type, the feedback type, the DAI group, the data priority, the content of DAI field, or the data processing capability.

Optionally, in some implementations, the processing module 420 is specifically configured to determine the at least one physical layer parameter according to at least one of a format of the first DCI, an RNTI for scrambling a CRC of the first DCI, an indicator field in the first DCI, a search space used for receiving the first DCI, or a resource set used for receiving the first DCI.

Optionally, in some implementations, the processing module 420 is specifically configured to determine the DAI group or the feedback codebook type according to the format of the first DCI and a first correspondence, where the first correspondence is a correspondence between DCI formats and feedback codebook types or DAI groups.

Optionally, in some implementations, the processing module 420 is specifically configured to determine the DAI group or the feedback codebook type according to the RNTI for scrambling a CRC of the first DCI and a second correspondence, where the second correspondence is a correspondence between RNTIs for scrambling a CRC of DCI and feedback codebook types or DAI groups.

Optionally, in some implementations, the processing module 420 is specifically configured to determine the DAI group or the feedback codebook type according to the search space used for receiving the first DCI and a third correspondence, where the third correspondence is a correspondence between search spaces and DAI groups or feedback codebook types.

Optionally, in some implementations, the processing module 420 is specifically configured to determine the DAI group or the feedback codebook type according to a CORESET used for receiving the first DCI and a fourth correspondence, where the fourth correspondence is a correspondence between CORESETs and DAI groups or feedback codebook types.

Optionally, in some implementations, the processing module 420 is further configured to determine the DAI group or the feedback codebook type according to the indicator field in the first DCI, where the indicator field indicates the DAI group or the feedback codebook type.

Optionally, in some implementations, the processing module 420 is further configured to map the data or feedback information onto a feedback codebook corresponding to the DAI group according to the DAI group, or map the data or feedback information onto a feedback codebook of the feedback codebook type according to the feedback codebook type.

Optionally, in some implementations, the processing module 420 is further configured to determine a location of the data or the control information in a feedback codebook corresponding to the feedback codebook type according to the feedback codebook type and/or the content of DAI field of the data or the control information.

Optionally, in some implementations, the processing module 420 is further configured to determine a location of the data or the control information in a dynamic feedback codebook according to the content of DAI field in the first DCI when the feedback codebook type of the data or the control information is the dynamic feedback codebook, or determine a location of the data or the control information in a semi-static feedback codebook according to a resource location of a PDSCH scheduled by the first DCI when the feedback codebook type of the data or the control information is the semi-static feedback codebook.

Optionally, in some implementations, the feedback codebook type includes a semi-static feedback codebook and a dynamic feedback codebook. The feedback type includes slot-based feedback and subslot-based feedback. The DAI group includes a first DAI group and a second DAI group, where the first DAI group and the second DAI group correspond to their respective feedback codebook types and/or feedback types.

Optionally, in some implementations, the processing module 420 is further configured to determine at least two physical layer parameters according to at least one of the format of the first DCI, the RNTI for scrambling a CRC of the first DCI, the indicator field in the first DCI, the search space used for receiving the first DCI, or the resource set used for receiving the first DCI, where the at least two physical layer parameters include at least two of a feedback information priority, a feedback codebook type, a feedback type, a DAI group, a data priority, a content of DAI field, and a data processing capability.

Optionally, in some implementations, the processing module 420 is specifically configured to determine at least two of the feedback information priority, the feedback codebook type, the feedback type, and the DAI group according to at least one of the format of the first DCI, the RNTI for scrambling a CRC of the first DCI, the indicator field in the first DCI, the search space used for receiving the first DCI, or the resource set used for receiving the first DCI; or determine the feedback information priority and the data priority according to at least one of the format of the first DCI, the RNTI for scrambling a CRC of the first DCI, the indicator field in the first DCI, the search space used for receiving the first DCI, or the resource set used for receiving the first DCI; or determine the feedback type and the data processing capability according to at least one of the format of the first DCI, the RNTI for scrambling a CRC of the first DCI, the indicator field in the first DCI, the search space used for receiving the first DCI, or the resource set used for receiving the first DCI.

Optionally, in some implementations, the communicating module described above may be a communication interface or a transceiver, or may be an input-output interface of a communication chip or a system-on-chip (SOC). The processing module described above may be one or more processors.

It should be understood that, the terminal device 400 according to implementations of the disclosure may correspond to the terminal device in the method implementations of the disclosure, and the above and other operations and/or functions of various units of the terminal device 400 are respectively intended for implementing corresponding operations of the terminal device in the method 200 illustrated in FIG. 4, which will not be repeated herein for the sake of simplicity.

Figure 9:
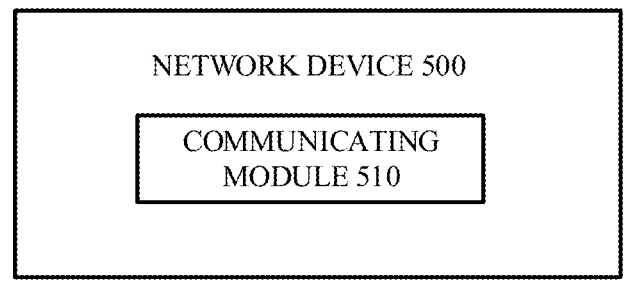
FIG. 9 is a schematic block diagram of a network device provided in implementations of the disclosure.

FIG. 9 is a schematic block diagram of a network device according to implementations of the disclosure. The network device 500 illustrated in FIG. 9 includes a communicating module 510. The communicating module 510 is configured to transmit first DCI to a terminal device, where the first DCI indicates at least one physical layer parameter, and the at least one physical layer parameter includes at least one of a feedback information priority, a feedback codebook type, a feedback type, a DAI group, a data priority, a content of DAI field, or a data processing capability.

Optionally, in some implementations, at least one of a format of the first DCI, an RNTI for scrambling a CRC of the first DCI, an indicator field in the first DCI, a search space used for receiving the first DCI, or a resource set used for receiving the first DCI indicates the at least one physical layer parameter.

Optionally, in some implementations, at least one of a format of the first DCI, an RNTI for scrambling a CRC of the first DCI, an indicator field in the first DCI, a search space used for receiving the first DCI, or a resource set used for receiving the first DCI indicates at least two physical layer parameters, and the at least two physical layer parameters include at least two of the feedback information priority, the feedback codebook type, the feedback type, the DAI group, the data priority, the content of DAI field, and the data processing capability.

Optionally, in some implementations, at least one of the format of the first DCI, the RNTI for scrambling a CRC of the first DCI, the indicator field in the first DCI, the search space used for receiving the first DCI, or the resource set used for receiving the first DCI indicates at least two of the feedback information priority, the feedback codebook type, the feedback type, and the DAI group; or at least one of the format of the first DCI, the RNTI for scrambling a CRC of the first DCI, the indicator field in the first DCI, the search space used for receiving the first DCI, or the resource set used for receiving the first DCI indicates the feedback information priority and the data priority, or at least one of the format of the first DCI, the RNTI for scrambling a CRC of the first DCI, the indicator field in the first DCI, the search space used for receiving the first DCI; or the resource set used for receiving the first DCI indicates the feedback type and the data processing capability.

Optionally, in some implementations, the feedback codebook type includes a semi-static feedback codebook and a dynamic feedback codebook. The feedback type includes slot-based feedback and subslot-based feedback. The DAI group includes a first DAI group and a second DAI group, where the first DAI group and the second DAI group correspond to their respective feedback codebook types and/or feedback types.

Optionally, in some implementations, the communicating module described above may be a communication interface or a transceiver, or may be an input-output interface of a communication chip or an SOC. The processing module described above may be one or more processors.

It should be understood that, the network device 500 according to implementations of the disclosure may correspond to the network device in the method implementations of the disclosure, and the above and other operations and/or functions of various units of the network device 500 are respectively intended for implementing corresponding operations of the network device in the method 300 illustrated in FIG. 7, which will not be repeated herein for the sake of simplicity.

Figure 10:
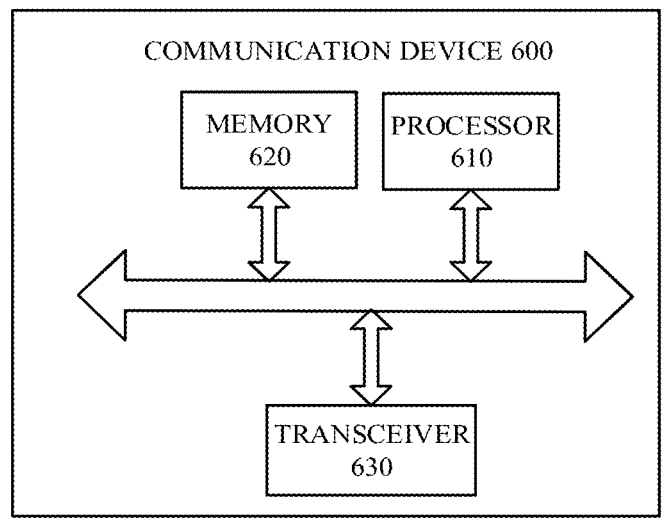
FIG. 10 is a schematic block diagram of a communication device provided in other implementations of the disclosure.

FIG. 10 is a schematic structural diagram of a communication device 600 provided in implementations of the disclosure. The communication device 600 illustrated in FIG. 10 includes a processor 610. The processor 610 can invoke and execute computer programs stored in a memory, to perform the method in implementations of the disclosure.

Optionally, as illustrated in FIG. 10, the communication device 600 may further include the memory 620. The processor 610 can invoke and execute the computer programs stored in the memory 620, to perform the method in implementations of the disclosure.

The memory 620 may be a separate device independent of the processor 610, or may be integrated into the processor 610 of the disclosure.

Optionally, as illustrated in FIG. 10, the communication device 600 can further include a transceiver 630. The processor 610 can control the transceiver 630 to communicate with other devices, specifically, to send information or data to other devices or to receive information or data from other devices.

The transceiver 630 may include a transmitter and a receiver. The transceiver 630 may further include an antenna, where one or more antennas can be provided.

Optionally, the communication device 600 may be operable as the network device in implementations of the disclosure, and the communication device 600 can implement the operations performed by the network device described in various methods in implementations of the disclosure, which will not be repeated herein for the sake of simplicity.

Optionally, the communication device 600 may be operable as the mobile terminal/the terminal device in implementations of the disclosure, and the communication device 600 can implement the operations performed by the mobile terminal/the terminal device described in various methods in implementations of the disclosure, which will not be repeated herein for the sake of simplicity.

Figure 11:
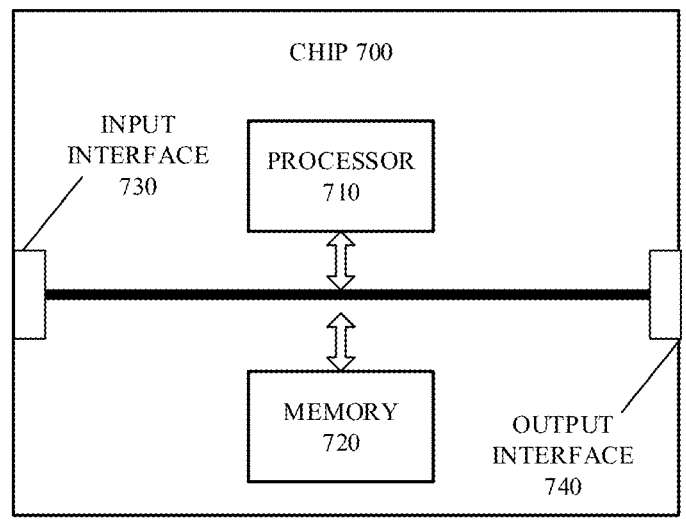
FIG. 11 is a schematic block diagram of a chip provided in implementations of the disclosure.

FIG. 11 is a schematic structural diagram of a chip according to implementations of the disclosure. The chip 700 illustrated in FIG. 11 includes a processor 710. The processor 710 can invoke and execute computer programs stored in a memory to perform the method in implementations of the disclosure.

Optionally, as illustrated in FIG. 11, the chip 700 further includes the memory 720. The processor 710 can invoke and execute the computer programs stored in the memory 720 to perform the method in implementations of the disclosure.

The memory 720 may be a separate device independent of the processor 710, or may be integrated into the processor 710.

Optionally, the chip 700 may further include an input interface 730. The processor 710 can control the input interface 730 to communicate with other devices or chips, specifically, to acquire information or data sent by other devices or chips.

Optionally, the chip 700 may further include an output interface 740. The processor 710 can control the output interface 740 to communicate with other devices or chips, specifically, to output information or data to other devices or chips.

Optionally, the chip is applicable to the network device in implementations of the disclosure. The chip can implement the operations performed by the network device described in various methods in implementations of the disclosure, which will not be repeated herein for the sake of simplicity.

Optionally, the chip is applicable to the mobile terminal/the terminal device in implementations of the disclosure. The chip can implement the operations performed by the mobile terminal/the terminal device described in various methods in implementations in the disclosure, which will not be repeated herein for the sake of simplicity.

It should be understood that, the chip referred to in implementations of the disclosure may also be referred to as an SOC.

Figure 12:
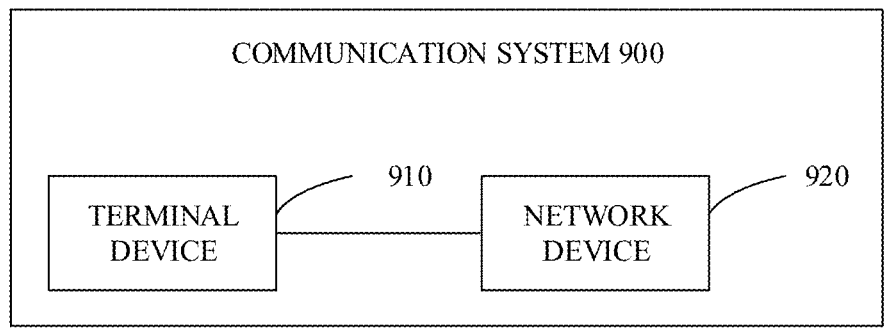
FIG. 12 is a schematic block diagram of a communication system according to implementations of the disclosure.

FIG. 12 is a schematic block diagram of a communication system 900 provided in implementations of the disclosure. As illustrated in FIG. 12, the communication system 900 includes a terminal device 910 and a network device 920.

The terminal device 910 can implement functions of the terminal device described in the foregoing methods, and the network device 920 can implement functions of the network device described in the foregoing methods, which will not be repeated herein for the sake of simplicity.

It should be understood that, the processor in implementations of the disclosure may be an integrated circuit chip with signal processing capabilities. During implementation, each step of the foregoing method implementations may be completed by an integrated logic circuit of hardware in the processor or an instruction in the form of software. The processor may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logic blocks disclosed in implementations of the disclosure can be implemented or executed. The general purpose processor may be a microprocessor, or the processor may be any conventional processor or the like. The steps of the method disclosed in implementations of the disclosure may be directly implemented as a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware thereof.

It can be understood that, the memory in implementations of the disclosure may be a volatile memory or a non-volatile memory, or may include both the volatile memory and the non-volatile memory. The non-volatile memory may be a ROM, a PROM, an erasable PROM (EPROM), an electrically EPROM (EEPROM), or flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM). It should be noted that, the memory of the systems and methods described in the disclosure is intended to include, but is not limited to, these and any other suitable types of memory.

It should be understood that, the above memory is intended for illustration rather than limitation. For example, the memory in implementations of the disclosure may also be an SRAM, a DRAM, an SDRAM, a DDR SDRAM, an ESDRAM, an SLDRAM, a DR RAM, etc. In other words, the memory in implementations of the disclosure is intended to include, but is not limited to, these and any other suitable types of memory.

Implementations of the disclosure further provide a computer readable storage medium. The computer readable storage medium is configured to store computer programs.

Optionally, the computer readable storage medium is applicable to the network device of implementations of the disclosure. The computer programs, when executed, are operable with a computer to implement the operations performed by the network device described in various methods in implementations of the disclosure, which will not be repeated herein for the sake of simplicity.

Optionally, the computer readable storage medium is applicable to the mobile terminal/the terminal device of implementations of the disclosure. The computer programs, when executed, are operable with a computer to implement the operations performed by the mobile terminal/the terminal device described in various methods in implementations of the disclosure, which will not be repeated herein for the sake of simplicity.

Implementations of the disclosure further provide a computer program product. The computer program product includes computer program instructions.

Optionally, the computer program product is applicable to the network device of implementations of the disclosure. The computer program instructions, when executed, are operable with a computer to implement the operations performed by the network device described in various methods in implementations of the disclosure, which will not be repeated herein for the sake of simplicity.

Optionally, the computer program product is applicable to the mobile terminal/the terminal device of implementations of the disclosure. The computer program instructions, when executed, are operable with a computer to implement the operations performed by the mobile terminal/the terminal device described in various methods in implementations of the disclosure, which will not be repeated herein for the sake of simplicity.

Implementations of the disclosure further provide a computer program.

Optionally, the computer program is applicable to the network device of implementations of the disclosure. The computer program, when executed by a computer, is operable with the computer to implement the operations performed by the network device described in various methods in implementations of the disclosure, which will not be repeated herein for the sake of simplicity.

Optionally, the computer program is applicable to the mobile terminal/the terminal device of implementations of the disclosure. The computer program, when executed by a computer, is operable with the computer to implement the operations performed by the mobile terminal/the terminal device described in various methods in implementations of the disclosure, which will not be repeated herein for the sake of simplicity.

Those of ordinary skill in the art will appreciate that units and algorithmic operations of various examples described in connection with implementations of the disclosure can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the specific working processes of the foregoing systems, apparatuses, and units, reference can be made to the corresponding processes of the above method implementations, which will not be repeated herein.

It will be appreciated that the systems, apparatuses, and methods disclosed in implementations of the disclosure may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device or unit, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure.

In addition, various functional units described in various implementations of the disclosure may be integrated into one processing unit or may be present as a number of physically separated units, and two or more units may be integrated into one.

If the functions are implemented as software functional units and sold or used as standalone products, they may be stored in a computer readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations of the disclosure. The above storage medium may include various kinds of media that can store program codes, such as a universal serial bus (USB) flash disk, a mobile hard drive, a ROM, a RAM, a magnetic disk, or an optical disk.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A wireless communication method, comprising:
receiving, by a terminal device, first downlink control information (DCI);
determining, by the terminal device, at least one physical layer parameter according to an indicator field in the first DCI, the at least one physical layer parameter comprising a feedback type, a feedback codebook type, and a downlink assignment indicator (DAI) group, wherein the indicator field is an existing indicator field, and the existing indicator field is a physical uplink control channel (PUCCH) resource indicator, if the PUCCH resource indicator indicates a sub slot PUCCH resource, a DAI in the first DCI corresponds to a first DAI group, if the PUCCH resource indicator indicates a slot PUCCH resource, a DAI in the first DCI corresponds to a second DAI group different from the first DAI group, wherein the first DAI group and the second DAI group each comprise a plurality of DAIs; wherein the feedback codebook type comprises semi-static HARQ-ACK codebook and dynamic HARQ-ACK codebook, the first DAI group corresponds to a semi-static HARQ-ACK codebook and the second DAI group corresponds to a dynamic HARQ-ACK codebook; and
transmitting, by the terminal device, data or control information according to the at least one physical layer parameter,
wherein transmitting, by the terminal device, the data or the control information according to the at least one physical layer parameter comprises:
mapping, by the terminal device, the data or feedback information onto a feedback codebook corresponding to the DAI group according to the DAI group: or
mapping, by the terminal device, the data or feedback information onto a feedback codebook of the feedback codebook type according to the feedback codebook type.

2. The method of claim 1, further comprising:
determining, by the terminal device, a location of the control information in a feedback codebook corresponding to the feedback codebook type according to at least one of the feedback codebook type or the content of DAI field.

3. The method of claim 2, wherein determining, by the terminal device, the location of the control information in the feedback codebook corresponding to the feedback codebook type according to at least one of the feedback codebook type or the content of DAI field comprises:
determining, by the terminal device, a location of the control information in a dynamic feedback codebook according to the content of DAI field in the first DCI when the feedback codebook type is the dynamic feedback codebook; or
determining, by the terminal device, a location of the control information in a semi-static feedback codebook according to a resource location of a physical downlink shared channel (PDSCH) scheduled by the first DCI when the feedback codebook type is the semi-static feedback codebook.

4. A wireless communication method, comprising:
transmitting, by a network device, first downlink control information (DCI) to a terminal device, an indicator field in the first DCI indicating at least one physical layer parameter, the at least one physical layer parameter comprising a feedback type, a feedback codebook type, and a downlink assignment indicator (DAI) group, wherein the indicator field is an existing indicator field, and the existing indicator field is a physical up link control channel (PUCCH) resource indicator, if the PUCCH resource indicator indicates a subslot PUCCH resource, a DAI in the first DCI corresponds to a first DAI group, if the PUCCH resource indicator indicates a slot PUCCH resource, a DAI in the first DCI corresponds to a second DAI group different from the first DAI group, wherein the first DAI group and the second DAI group each comprise a plurality of DAIs; wherein the feedback codebook type comprises semi-static HARQ-ACK codebook and dynamic HARQ-ACK codebook, the first DAI group corresponds to a semi-static HARQ-ACK codebook and the second DAI group corresponds to a dynamic HARQ-ACK codebook; and
wherein the at least one physical layer parameter is to be used by the terminal device to perform:
mapping, by the terminal device, data or feedback information onto a feedback codebook corresponding to the DAI group according to the DAI group; or
mapping, by the terminal device, the data or feedback information onto a feedback codebook of the feedback codebook type according to the feedback codebook type.

5. The method of claim 4, wherein at least one of a format of the first DCI, an RNTI for scrambling a CRC of the first DCI, the indicator field in the first DCI, a search space used for receiving the first DCI, or a resource set used for receiving the first DCI indicates at least two physical layer parameters, and the at least two physical layer parameters comprise at least two of a feedback information priority, the feedback codebook type, the feedback type, the DAI group, a data priority, a content of DAI field, and a data processing capability.

6. A terminal device, comprising:
a transceiver;
a memory storing computer programs; and
a processor, configured to execute the computer programs stored in the memory to:
make the transceiver receive first downlink control information (DCI);
determine at least one physical layer parameter according to an indicator field in the first DCI, the at least one physical layer parameter comprising a feedback information priority, a feedback type, and a feedback codebook type, and a downlink assignment indicator (DAI) group, wherein the indicator field is an existing indicator field, and the existing indicator field is a physical uplink control channel (PUCCH) resource indicator, if the PUCCH resource indicator indicates a subslot PUCCH resource, a DAI in the first DCI corresponds to a first DAI group, if the PUCCH resource indicator indicates a slot PUCCH resource, a DAI in the first DCI corresponds to a second DAI group different from the first DAI group, wherein the first DAI group and the second DAI group each comprise a plurality of DAIs: wherein the feedback codebooktype comprises semi-static HARQ-ACK codebook and dynamic HARQ-ACK codebook, the first DAI group corresponds to a semi-static HARQ-ACK codebook and the second DAI group corresponds to a dynamic HARQ-ACK codebook; and make the transceiver transmit the data or control information according to the at least one physical layer parameter and a downlink assignment indicator (DAI) group;

wherein the transceiver configured to transmit the data or control information according to the at least one physical layer parameter and the DAI group is configured to:

map data or feedback information onto a feedback codebook corresponding to the DAI group according to the DAI group; or map the data or feedback information onto a feedback codebook of the feedback codebook type according to the feedback codebook type.

7. The terminal device of claim 6, wherein the processor is further configured to:

determine a location of the control information in a feedback codebook corresponding to the feedback codebook type according to at least one of the feedback codebook type or a content of DAI field.

8. The terminal device of claim 7, wherein the processor is further configured to:

determine a location of the control information in a dynamic feedback codebook according to the content of DAI field in the first DCI when the feedback codebook type is the dynamic feedback codebook; and determine a location of the control information in a semi-static feedback codebook according to a resource location of a physical downlink shared channel (PDSCH) scheduled by the first DCI when the feedback codebook type is the semi-static feedback codebook.

9. A network device, comprising:

a transceiver;

a memory storing computer programs; and a processor, configured to execute the computer programs stored in the memory to:

cause the transceiver to transmit first downlink control information (DCI) to a terminal device, an indicator field in the first DCI indicating at least one physical layer parameter, the at least one physical layer parameter comprising a feedback information priority, and further comprising a feedback type, a feedback codebook type, and a downlink assignment indicator (DAI) group, wherein the indicator field is an existing indicator field, and the existing indicator field is a physical uplink control channel (PUCCH) resource indicator, if the PUCCH resource indicator indicates a subslot PUCCH resource, a DAI in the first DCI corresponds to a first DAI group, if the PUCCH resource indicator indicates a slot PUCCH resource, a DAI in the first DCI corresponds to a second DAI group different from the first DAI group, wherein the first DAI group and the second DAI group each comprise a plurality of DAIs; wherein the feedback codebook type comprises semi-static HARQ-ACK codebook and dynamic HARQ-ACK codebook, the first DAI group corresponds to a semi-static HARQ-ACK codebook and the second DAI group corresponds to a dynamic HARQ-ACK codebook; and wherein the at least one physical layer parameter is to be used by the terminal device to:

map, by the terminal device, data or feedback information onto a feedback codebook corresponding to the DAI group according to the DAI group; or map, by the terminal device, the data or feedback information onto a feedback codebook of the feedback codebook type according to the feedback codebook type.

10. The network device of claim 9, wherein at least one of a format of the first DCI, an RNTI for scrambling a CRC of the first DCI, the indicator field in the first DCI, a search space used for receiving the first DCI, or a resource set used for receiving the first DCI indicates at least two physical layer parameters, and the at least two physical layer parameters comprise at least two of a feedback information priority, the feedback codebook type, the feedback type, the DAI group, a data priority, a content of DAI field, and a data processing capability.

* * * * *